United States Patent [19]

Nigro et al.

[11] Patent Number: 5,068,095

[45] Date of Patent: * Nov. 26, 1991

[54] METHOD FOR REDUCING THE AMOUNT OF COLORANTS IN A CAUSTIC LIQUOR

[75] Inventors: William A. Nigro, Benton, Ark.; Gary A. O'Neill, Tyngsborough, Mass.

[73] Assignee: Aluminum Company of America, Pittsburgh, Pa.

[*] Notice: The portion of the term of this patent subsequent to Apr. 10, 2007 has been disclaimed.

[21] Appl. No.: 507,386

[22] Filed: Apr. 10, 1990

Related U.S. Application Data

[63] Continuation-in-part of Ser. No. 275,683, Nov. 23, 1988, Pat. No. 4,915,930, which is a continuation of Ser. No. 891,751, Jul. 31, 1986, abandoned.

[51] Int. Cl.⁵ ............................ C01D 1/32; C01F 7/04
[52] U.S. Cl. ........................................ 423/122; 423/183; 423/600; 423/629; 423/641
[58] Field of Search ............... 423/629, 111, 112, 122, 423/600, 183, 641

[56] References Cited

U.S. PATENT DOCUMENTS 4,915,930 4/1990 Goheen et al. .................. 423/112

FOREIGN PATENT DOCUMENTS 31527 7/1982 Japan ............................... 423/629

Primary Examiner—Wayne A. Langel
Attorney, Agent, or Firm—Gary P. Topolosky

[57] ABSTRACT

A method for treating caustic solutions to remove colorants, including iron, therefrom comprises: contacting the solution with a substance comprising a calcined product of a compound having the formula: $A_wB_x(OH)_yC_z \cdot nH_2O$, wherein A represents a divalent metal cation; B a trivalent metal cation; C a mono- to tetravalent anion; and w, x, y, z and n satisfying the following: $0 < z \leq x \leq 4 \leq w \leq \frac{1}{2}y$ and $12 \geq n \geq \frac{1}{2}(w-x)$. On a preferred basis, the contacted substance is a hydrotalcite derivative made by reacting activated magnesia with an aqueous solution of aluminate, carbonate, and hydroxyl anions before calcining at one or more temperatures between about 400°–650° C. There is further disclosed a method for producing an aluminum hydroxide having improved whiteness according to the invention.

20 Claims, 1 Drawing Sheet

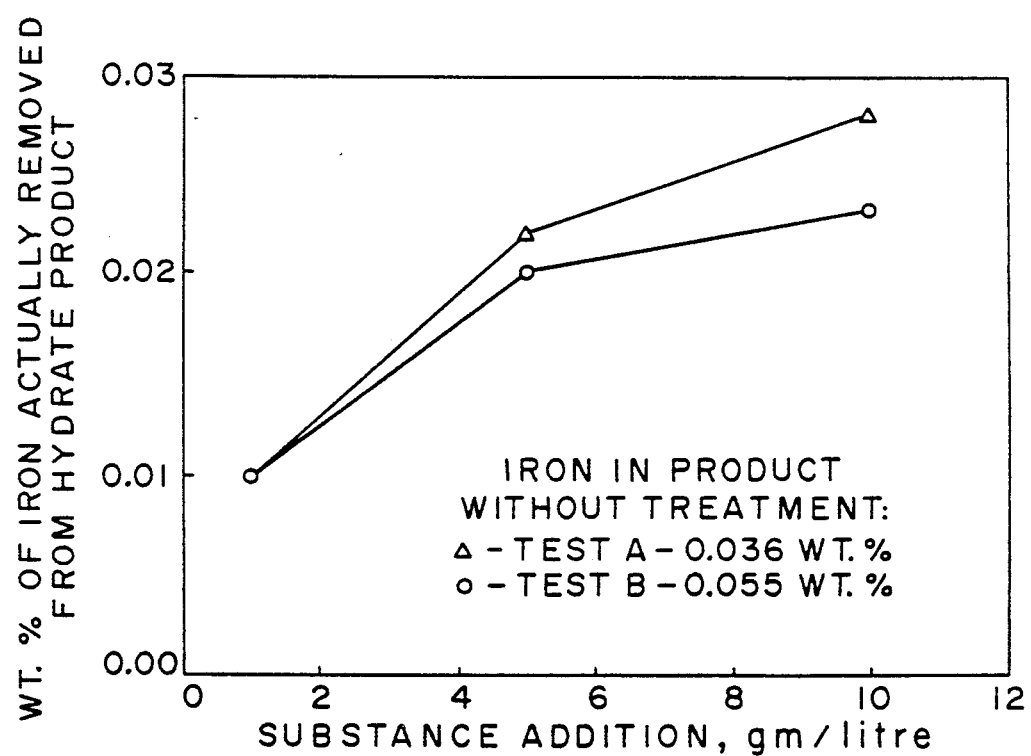

METHOD FOR REDUCING THE AMOUNT OF COLORANTS IN A CAUSTIC LIQUOR

This application is a continuation-in-part of U.S. Application Ser. No. 07/275,683, Pat. No. 4,915,930, which is a continuation of U.S. Application Ser. No. 06/891,751, now abandoned, both disclosures of which are fully incorporated by reference herein.

BACKGROUND OF THE INVENTION

1. Field of Use

This invention relates to the purification of caustic liquors and high caustic streams. More particularly, the invention relates to the removal of iron and other colorants, especially anionic contaminants, from a sodium aluminate (or Bayer) liquor. The invention further relates to a means for producing: an improved caustic (NaOH); and improved aluminum hydroxide product having higher whiteness/brightness levels.

2. Technology Review

The recovery of aluminum hydroxide from bauxite ore and similar alumina-bearing materials according to the Bayer process is achieved by digesting hydroxide-containing ore with a caustic liquor. A major portion of alumina is dissolved by this liquor, while most unwanted ore constituents remain undissolved making them separable from the liquor. Such undissolved constituents are sometimes referred to as "red mud". After pressure digestion of bauxite with a caustic liquor such as sodium aluminate, the red mud may be removed from this liquor by decantation and filtration. Aluminum hydroxide is then separated from a supersaturated sodium aluminate liquor, also known as "green" or "pregnant" liquor, typically by precipitation. During such precipitation, the supersaturated sodium aluminate liquor is cooled and mixed with a slurry of fine aluminum hydroxide particles which act as seeds to induce formation of more aluminum hydroxide. Following such precipitation, this slurry is pumped through a classification system through which a coarse fraction of crystallized aluminum hydroxide is separated from the liquor while the resulting spent sodium aluminate is recycled to the digester for mixing with new (incoming) bauxite.

High levels of impurities are undesirable in the Bayer (or "green") liquor used to produce aluminum hydroxide. Because these impurities decrease the whiteness or color purity of the aluminum hydroxide precipitated therefrom, it is desirable to minimize their presence in green sodium aluminate before any crystallization takes place. Typically, the impurities result in an aluminum hydroxide product having lower than about 70% whiteness. Such impurity levels impair the use of this hydroxide in commercial products where a high level of whiteness is required. The present invention solves the problem of poor whiteness while producing an aluminum hydroxide having whiteness or brightness levels of about 80% or more (based on a 100% $TiO_2$ reference standard).

When organic and inorganic impurities are present in a caustic liquor, process problems such as lower liquor productivity and reduced alumina purity also result. Still other difficulties caused by the presence of organic impurities include: lower alumina yield; the generation of excessive fine hydroxide particles; production of a colored liquor and colored aluminum hydroxide; lower red mud settling rates; the loss of caustic due to formation of sodium organics; an increase in liquor density; increased viscosities; a raised boiling point; and unwanted foaming of the liquor.

Numerous methods are known for controlling and/or removing organics from a Bayer process (or green) liquor. These include treatment of the process liquor with sodium hypochlorite or other oxidizing agents such as oxygen or air. For example, German Patent No. 2,945,152 describes a process for removing organic compounds from Bayer liquors by heating to 120°-350° C. and introducing oxygen-containing gas until a partial pressure of 3-30 atmospheres is reached. Australian Patent No. 12085/83 discloses treating Bayer liquors with reactive magnesium oxide or magnesium hydroxide before calcining the resulting magnesium-aluminum compound at 900° C. or more. In Japanese Patent No. 59-102819, organic colorants are removed from an aluminate solution through contact with a waste salt mud consisting of 30-60% calcium sulfate, 10-70% calcium carbonate and 5-20% magnesium hydroxide. Inao et al U.S. Pat. No. 4,215,094 discloses an organic removing process which includes contacting sodium aluminate solutions with molecular oxygen containing gases in the presence of copper ions (catalyst) at elevated temperatures of from 180° to 300° C. According to Swinkels et al U.S. Pat. No. 4,836,990, organics may be removed from Bayer liquors through contact with manganese dioxide. Such contact causes the organics therein to oxidize.

It is known to remove still other impurities from Bayer liquors by treatment with alkaline earth compounds. Schepers et al U.S. Pat. No. 4,046,855, for example, teaches treating aluminate liquors with a magnesium compound to remove organic colorants. Mercier et al U.S. Pat. No. 4,101,629 treats Bayer process solutions with a barium compound to remove impurities. German Patent No. 2,415,872 adds a calcium compound to the process liquor to remove humic matter as insoluble calcium compounds.

In The et al U.S. Pat. No. 4,676,959, an aluminum hydroxide product having improved levels of whiteness is produced by passing caustic solutions through specially coated, hollow sulfonated polysulfone fibers. In The et al U.S. Pat. No. 4,678,477, a method for purifying caustic solutions is disclosed which includes contact with the outside of specially coated, polysulfone fibers and collection of purified product from an open end of these fibers.

The impurity levels of organics, such as sodium oxalate, in sodium aluminate solutions have also been lowered using cationic sequestrants comprising quaternary nitrogen compounds with medium and long chain alkyl groups as taught in Lever U.S. Pat. No. 4,275,042. DeLaBretique U.S. Pat. No. 3,457,032 discloses purification of a strongly alkaline solution using strongly basic and macroreticular anion exchange resins.

In Carruthers et al U.S. Pat. No. 4,038,039, the removal of sodium oxalate from a sodium aluminate liquor by spraying concentrated liquor onto a packing material is disclosed. Bush et al U.S. Pat. No. 4,496,524 teaches removing sodium oxalate from spent Bayer liquors with ethanol. Such treatment causes the sodium oxalate to precipitate from the liquor.

Yamada et al U.S. Pat. No. 4,280,987 removes carbon compounds from a Bayer liquor stream by adjusting the molar ratio of aluminum component to sodium component before heating the liquor to: (i) form sodium aluminate; and (ii) drive the carbon compounds off as carbon dioxide. Bird et al U.S. Pat. No. 4,282,191 describes removing zinc impurities from sodium aluminate caustic using zinc sulfide as seed material.

Columbo et al U.S. Pat. No. 3,295,961 discloses a process for removing iron impurities from the red mud slurry of a Bayer process by first drying the red mud before heating to reduce the iron compounds therein to metallic iron for subsequent separation from dried red mud using magnetic separators. Goheen U.S. Pat. No. 3,729,542 teaches removing iron impurities in a sodium aluminate solution by filtering through a bed of iron particulates. Japanese Patent No. 56-18534 separates iron from a sodium aluminate stream using preheated red mud or bauxite.

Japanese Patent No. 57-31527 discloses a method for producing aluminum hydroxide of high whiteness by adding one or more types of alkaline earth metal compounds to a sodium aluminate (Bayer) solution. Representative compound additives include oxides, hydroxides, carbonates, silicates and nitrates of magnesium or calcium; and carbonates, silicates, nitrates and sulfates of barium.

In Tsai U.S. Pat. No. 3,574,537, iron oxide is extracted from red mud by passing $SO_2$ through a solution of the mud. Still other impurities such as $SiO_2$ precipitate out upon heating until a pH of 4.5-5.0 is attained. Adams U.S. Pat. No. 3,796,789 discloses lowering the iron content of sodium aluminate liquors by bringing the liquor to atmospheric conditions, adding slaked lime thereto, and subsequently digesting the same. Dobos et al U.S. Pat. No. 3,989,513 treats Bayer process red mud to obtain raw iron and a slag from which sodium aluminate and calcium aluminate can be leached. German Pat. No. 3,501,350 adds a mixture of calcium oxide/hydroxide and kierserite ($MgSO_4 \cdot H_2O$) to Bayer liquors for lowering the impurity levels (especially Fe content) of the resulting aluminum hydroxide. In Russian Patent No. 468,888, sodium sulfate is added to increase the efficiency of precipitating a lower iron hydroxide from an alkaline aluminate solution.

Green et al U.S. Pat. No. 4,083,925 precipitates ferrous iron from an alkali metal aluminate liquor using an anionic polyacrylamide having a molecular weight of at least 2,800,000. Owen et al U.S. Pat. No. 4,713,222 shows removing iron compounds from Bayer liquors by seeding with ferrous ammonium sulfate before adding a starch and/or acrylic acid polymeric flocculant thereto. In Spitzer et al U.S. Pat. No. 4,717,550, the iron content of a Bayer process stream is reduced using a tertiary hydroxyl-containing polyamine.

McDaniel U.S. Pat. No. 4,324,769 claims an improved process for extracting alumina hydrate from ore, said hydrate having an iron content of less than 0.03% by weight. The process involves digestion with various alumina-to-caustic ratios in a series of separate reaction vessels maintained at different temperatures. In McDaniel U.S. Pat. No. 4,446,117, a variation of the aforementioned process produces alumina hydrate containing less than 0.017% iron oxide by weight.

Various methods for using hydrotalcite-like compounds are also known. Anabuki et al U.S. Pat. No. 4,415,555, for example, discloses treating an iron deficiency disease with a hydrotalcite-like structure, one embodiment of which has the formula:

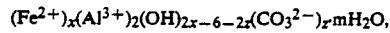

wherein $1 \leq x \leq 20$, $0 < z < 3$ and $0 \leq m \leq 8$. A related compound for increasing the iron level of hemoglobins and/or serums is claimed in Miyata et al U.S. Pat. No. 4,629,626. In Sood U.S. Pat. No. 4,752,397, heavy metal ions are removed from an impure aqueous solution using activated hydrotalcite. Representative metal ions removed by this process include: antimony, arsenic, beryllium, cadmium, chromium, copper, lead, mercury, nickel, selenium, silver, thallium, tin and zinc.

SUMMARY OF THE INVENTION

It is a principal objective of this invention to provide uncomplicated means for removing colorants including iron from a caustic solution such as sodium hydroxide or sodium aluminate, the Bayer or "green" liquor which results from processing bauxite to make alumina therefrom. It is another objective to provide a colorant removal method which acts independent of the initial iron content, i.e., no minimum level of Fe need be present. Yet another objective provides means for removing anionic forms of iron and other contaminants, as well as some organic colorants, from still other high caustic streams, including those associated with paper processing/manufacture.

It is another objective to provide means for improving the whiteness/brightness levels of aluminum hydroxide precipitate while incurring little to no product losses. In so doing, this invention provides significant advantage over currently known step precipitation methods. It is another objective to provide more consistent means for removing iron from red mud than currently known practices of using: filter aids and precoats (lime additions); high iron bauxites; and/or adding bauxite-mud-sand recycles to green liquors.

It is still another objective to provide a low cost, low capital expenditure method for selectively removing iron and other discoloring anionics, contaminants, especially from the sodium aluminate liquor resulting from production of alumina by the well-known Bayer process. Another objective provides a Bayer liquor treatment method which uses a wet or dry additive as part of a large scale operation. It is a further objective to overcome the problems and disadvantages associated with the various treatment methods set forth above.

In accordance with the foregoing objectives, there is provided means for treating a caustic solution to remove substantially all colorants, including iron, therein. The method contacts Bayer (and other high caustic) liquors with a reactive substance comprising the calcined derivative of a compound having the formula: $A_wB_x(OH)_yC_z \cdot nH_2O$ wherein A represents a divalent metal cation; B a trivalent metal cation; C a mono- to tetravalent anion; and w, x, y, z and n satisfy the following:

$$0 < z \leq x \leq 4 \leq w \leq 1/2y \text{ and } 12 \geq n \geq 1/2(w-x).$$

Said substance may be added directly to the solution in a dry, powdered form, or as part of a slurry. Alternately, caustic solutions such as NaOH may be passed through a containment of this substance. On a preferred basis, the substance consists essentially of a product made by reacting activated magnesia with an aqueous solution of aluminate, carbonate and hydroxyl ions before calcining at one or more temperatures between about 400-600° C. There is further disclosed means for producing aluminum hydroxide having improved whiteness/brightness levels according to the invention.

BRIEF DESCRIPTION OF THE DRAWING

Further features, other objectives and advantages of this invention will be made clearer from the following detailed description made with reference to the accompanying Figure in which is shown the extent to which iron is removed from representative aluminum hydroxide solutions at various calcined hydrotalcite dosage levels.

DETAILED DESCRIPTION OF THE PREFERRED EMBODIMENTS

In this description of preferred embodiments, repeated reference is made to the treatment of Bayer (or green) liquors using sufficient amounts of a calcined hydrotalcite substance. It shall be understood that the invention also applies to other high caustic solutions, such as caustic (NaOH) and those liquor streams resulting from known paper processing techniques, and to still other metal hydroxide compounds belonging to the same structural family, said family comprising any compound having the formula: $A_wB_x(OH)_yC_z\cdot nH_2O$, wherein A represents a divalent metal cation, B a trivalent metal cation, C a mono- to tetravalent anion, and w, x, y, z and n satisfy the following conditions: $0<z\leq x\leq 4\leq w\leq 1/2y$ and $12\leq n\leq 1/2(w-x)$. Preferred embodiments of this family have been identified by the formula: $A_6B_2(OH)_{16}C_z\cdot 4H_2O$, wherein A is selected from: $Mg^{2+}$, $Ni^{2+}$, $Fe^{2+}$ and $Zn^{2+}$; B from: $Al^{3+}$, $Fe^{3+}$ and $Cr^{3+}$; and C from an anion list which includes: $OH^-$, $Cl^-$, $Br^-$, $NO_3^-$, $CH_3COO^-$, $CO_3^{2-}$, $SO_4^{2-}$, $PO_4^{3-}$, $Fe(CN)_6^{3-}$ and $Fe(CN)_6^{4-}$ with $\frac{1}{2}\leq z\leq 2$ (depending on the charge of the anion substituted therein). Some references collectively refer to all compounds having the above formulae as "hydrotalcites". For purposes of this invention, however, this family of structural compounds has been divided into various subgroups depending on the divalent and trivalent cations within its alternating brucite-like layers. For example, pyroaurites have the basic formula: $Mg_6Fe_2OH_{16}CO_3\cdot 4H_2O$. (Such compounds are also known as "sjogrenites".) Takovites, on the other hand, consist of compounds resembling: $Ni_6Al_2OH_{16}CO_3\cdot 4H_2O$.

One other preferred definition for the term "hydrotalcite" includes any natural or synthetic compound satisfying the formula: $Mg_6Al_2(OH)_{16}CO_3\cdot 4H_2O$. This compound has been rewritten as: $6MgO\cdot Al_2O_3\cdot CO_2\cdot 12H_2O$. In its ionic form, hydrotalcite reappears as: $[Mg_6Al_2(OH)_{16}]^{2+}\cdot [CO_3]^{2-}\cdot 4H_2O$. The main structural unit for this compound is brucite, or magnesium hydroxide ($Mg(OH)_2$) having the form of octagonal sheets with an Mg ion between multiple (OH) ions sharing adjacent edges. By substituting trivalent aluminum ions for some of the divalent magnesium of this structure, sublayers of magnesium and aluminum are created which maintain brucite's basic sheet-like structure. To compensate for the charge imbalance from these aluminum ion substitutions, anions (indicated by letter "C" in the foregoing formulae) and water molecules are intercalated to form interlayers of ($C_z\cdot nH_2O$) between the brucite-like structural layers, with $\frac{1}{2}\leq z\leq 2$ depending on the anionic charge intercalated therein. The anion having the greatest affinity to combine with water in this structure and form hydrotalcite is carbonate ($CO_3^{2-}$).

The spacial distribution of carbonate ions within hydrotalcite depends, in part, on how the $Al^{3+}$ ions substitute from $Mg^{2+}$ therein. Brucite layer spacing is also a function of the amount or degree of aluminum substitution into hydrotalcite's basic structure. As aluminum substitution increases, interlayer spacing decreases due to an increase in the electrostatic attraction between positive hydroxide layers and hydrotalcite's negative interlayers. Interlayer thicknesses may also vary depending on the size and orientation of the anions substituted for some or all of the carbonate ions in hydrotalcite.

Hydrotalcite exists in both a natural and synthetic form. Naturally occurring deposits have been found in Snarum, Norway and in the Ural Mountains. Typical occurrences ar in the form of serpentines, talc schists, or as an alteration product where hydrotalcite forms a pseudomorph of a spinel. Like most ores, natural hydrotalcite is virtually impossible to find in a pure state. Natural deposits typically contain one or more other minerals including, but not limited to, penninite and muscovite.

Several methods for making synthetic hydrotalcite are also known. Such synthetic products may be produced as a fine powder, $-20$ mesh granules or as $\frac{1}{8}$-inch diameter extrudates, among other forms. In U.S. Pat. No. 3,539,306, an aluminum hydroxide, aluminum-amino acid salt, aluminum alcoholate, water soluble aluminate, aluminum nitrate and/or aluminum sulfate are mixed with a magnesium component selected from magnesium oxide, magnesium hydroxide or water-soluble magnesium salt; and a carbonate ion-containing compound in an aqueous medium maintained at a pH of 8 or more. The resulting product may be used as a stomach antacid. In Misra U.S. Pat. No. 4,904,457, the disclosure of which is fully incorporated by reference herein, yet another method for synthesizing hydrotalcite is disclosed. The method comprises heating magnesium carbonate and/or magnesium hydroxide to form activated magnesia, then combining said activated magnesia with an aqueous solution of aluminate, carbonate and a hydroxyl.

Other known methods for synthesizing hydrotalcite include: adding dry ice or ammonium carbonate to: (a) a mixture of magnesium oxide and alpha-alumina; or to (b) a thermal decomposition product from a magnesium nitrate-aluminum nitrate mixture, after which intermediate product is subjected to temperatures below about 325° F. and pressures of 2,000 to 20,000 psi. Yet another process for producing synthetic hydrotalcite is disclosed in "Properties of a Synthetic Magnesium-Aluminum Carbonate Hydroxide and its Relationship to Magnesium-Aluminum Double Hydroxide Manasseite, and Hydrotalcite", *The American Minerologist*, Vol. 52, pp. 1036–1047 (1967). Therein, Ross et al describe producing hydrotalcite-like material by titrating a solution of $MgCl_2$ and $AlCl_3$ with NaOH in a carbon dioxide-free system. This suspension is then dialyzed for 30 days at 60° C. to form a hydrated Mg-Al carbonate hydroxide having the properties of both manasseite and hydrotalcite.

In preferred embodiments of this invention, caustic solutions are treated by contacting said solutions with a substance comprising calcined hydrotalcite. By use of the term "comprising", it is meant that the contacting substance should contain greater than about 85 or 90%, and more preferably greater than about 95 or 98%, of the calcined (or activated) form of hydrotalcite. For improved efficiency, still lower percentages of calcined hydrotalcite substances may be used, even as low as about 50% in total substance content. Such lower levels would require larger (or repeat) doses of treatment materials, however.

By use of the term "substantially" throughout, it is meant that virtually all, or at least 95 to 98% of the undesired colorant (especially iron) has been removed from solution. As physical processes are not often perfect, however, every last vestige of colorant/impurity may not be removed through contact with calcined hydrotalcite by this invention, especially in applications where underdosing occurs.

In its fully dehydrated state, calcined hydrotalcite is believed to have the formula: $Mg_6Al_2O_8(OH)_2$. When only partially activated or calcined, hydrotalcite will contain still more water ions. An alternative embodiment of this invention employs granular calcined hydrotalcite, which may be made by combining calcined hydrotalcite powder with about 10 to 35% of one or more binder materials. The heat treatment of natural or synthetic hydrotalcite to form its calcined variant may be carried out in any conventional (or newly-developed) medium maintained at temperatures between about 400°–650° C., although temperatures as low as 300° C. may also suffice. Preferred activation temperatures between about 425°–500° C. tend to maximize this compound's surface area and pore volume, while heating to above about 800° C. appears to impair its overall adsorptive capacity.

Following the thermal activation of hydrotalcite, a substance having a porous, skeletal structure is produced from which most if not all of its water and carbonate ions have been expelled. This product has an average pore diameter of about 55 angstroms; a skeletal (or solid component) density of about 2.9 g/cm$^3$; and a total pore volume of about 0.3 cm$^3$/g. After calcination, hydrotalcite's specific surface area increases from about 20 m$^2$/g to between about 50–200 m$^2$/g, as determined by BET nitrogen adsorption.

In one embodiment of this invention, the iron content of an aluminate solution obtained in the production of aluminum hydroxide from bauxite according to the Bayer process is lowered by contacting the solution with a substance comprising a calcined form of a compound having the formula $A_6B_2(OH)_{16}C_z \cdot 4H_2O$, wherein A is selected from $Mg^{2+}$, $Ni^{2+}$, $Fe^{2+}$ and $Zn^{2+}$; B from: $Al^{3+}$, $Fe^{3+}$ and $Cr^{3+}$; C from: $OH^-$, $Cl^-$, $Br^-$, $NO_3^-$, $CH_3COO^-$, $CO_3^{2-}$, $SO_4^{2-}$, $PO_4^{3-}$, $Fe(CN)_6^{3-}$ and $Fe(CN)_6^{4-}$ with $\frac{1}{2} \leq z \leq 2$. Contacted substance is then separated from this solution before precipitation of a whiter/brighter aluminum hydroxide occurs. Preferably, only contacted substance which is saturated (or fully loaded) with colorants is removed from solution while undesirable levels of iron still remain.

In preferred embodiments, iron removal is practiced by directly-adding powdered (or granulated) forms of calcined hydrotalcite to the caustic being treated. The amount of substance to add may be predetermined by testing representative samples of solution so as to avoid underdosing or wasteful overdosing. Saturated or spent substance is then separated from a caustic treated according to the invention by any known or subsequently-developed technique(s) including filtration, gravity settling and centrifugation.

Calcined hydrotalcite powders may also be combined with up to about 35% of one or more binders before being extruded, formed or otherwise shaped into large particle sizes. On a preferred basis, combining calcined hydrotalcite with up to about 10% binder produces granules for better handling and/or disposal. Suitable binder materials include, but are not limited to, ethyl cellulose, Ludox ® (a colloidal silica sold by E. I. DuPont de Nemours of Wilmington, Delaware), and Cab-o-sil ® (a colloidal silica sold by Cabot Corporation of Boston, Massachusetts). Such granules may also be loaded in a column, fluidized bed or other containment through which contaminated caustics may be passed.

Another embodiment method of this invention exposes caustic solutions containing (anionic) iron colorants to a semi-solid sludge, or slurry containing activated or calcined hydrotalcite. Representative iron colorants removed from solution according to this invention include: $NaFeO_2$, $FeOOH$, and $Fe_2O_3$. This same invention may also be practiced to remove organic colorants, such as certain humic acids, from these same liquor streams.

In yet another alternative, aluminum hydroxide having improved whiteness/brightness is made by first dissolving an aluminum hydroxide contaminated with undesirable colorants in an aqueous solution containing sodium hydroxide. Thereafter, the resulting solution is contacted with a calcined form of hydrotalcite, pyroaurite, takovite, or mixtures thereof. Spent substance is separated from this solution by known or subsequently developed means including filtration, gravitation, centrifugation, or the like. An aluminum hydroxide having improved whiteness is then precipitated from the remaining solution, preferably by seeding with a pure form of aluminum hydroxide. Such precipitation preferably occurs at one or more temperatures between about 60°–85° C. (140°–185° F.) to produce an improved, brighter hydroxide having an iron content of less than about 0.05% by weight. On a more preferred basis, this aluminum hydroxide product contains less than about 0.03%, 0.01% or even 0.005% by weight iron (usually present as $Fe_2O_3$). Most preferably, total iron contents of below about 0.001% by weight can be achieved through repeated dosages of substance. This sam treated hydrate product has a brightness level of at least about 80% based on a 100% $TiO_2$ reference standard.

The method of this invention is generally more receptive to adsorbing from caustic solutions iron and other anionic colorants which are divalent, trivalent or higher. Calcined hydrotalcite also removes from caustic liquors monovalent contaminants, and even certain humic acid colorants, however. Without being limited as to any particular theory of operation, it is believed that preferred embodiments of this invention proceed as follows. Upon calcination (or activation), both carbonate and water are expelled from hydrotalcite's basic structure according to the formula:

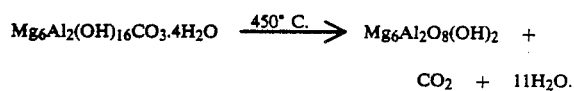

$$Mg_6Al_2(OH)_{16}CO_3 \cdot 4H_2O \xrightarrow{450° \text{ C.}} Mg_6Al_2O_8(OH)_2 + CO_2 + 11H_2O.$$

Contact of this substance with an iron-containing caustic then causes the colorant to occupy vacated anion positions in the calcined hydrotalcite during rehydration. The foregoing mechanism also explains why this method proceeds more efficiently in environments which are substantially free of carbon dioxide and/or carbonate.

In the accompanying Figure, starting hydrate products having two distinct levels of iron contamination were treated with various dosages of calcined hydrotalcite according to the invention. In Test A (octagonal data points), hydrate having a low initial iron content of 0.036 wt% was treated; in Test B (triangular points), hydrate product with higher levels of iron, about 0.055 wt%, was treated. Although lower substance dosages (about 1 g/L) produced less reduction in iron content than the higher dosages (about 10 g/L), it is important to note that hydrate product treatment according to the invention does not depend on the iron level in the starting material. There need not be a minimum level of iron present for calcined hydrotalcite to effectively remove the same from hydrate products or a caustic stream. Conceivably, therefore, substantially all colorant can be removed from an aluminate solution by treatment according to the aforementioned method.

In the following Table, data for the Test B results averaged in the accompanying Figure have been set forth. This Table details the amount of iron removal that occurs based on various substance dosage levels and contact times. For all of these examples, a constant mixing temperature of 77° C. (170° F.) was used.

TABLE

| Contact Time (min) | Amount of Substance Added (g/L) | Starting Wt % of Fe in Hydrate | Ending Wt % of Fe in Treated Hydrate |
|---|---|---|---|
| 30 | 1 | 0.055 | 0.045 |
| 30 | 5 | 0.055 | 0.036 |
| 30 | 10 | 0.055 | 0.031 |
| 60 | 1 | 0.055 | 0.038 |
| 60 | 5 | 0.055 | 0.031 |
| 60 | 10 | 0.055 | 0.024 |

Having described the presently preferred embodiments, it is to be understood that the invention may be otherwise embodied within the scope of the appended claims which follow.

What is claimed is:

1. A method for treating a caustic solution to remove a colorant therefrom, said method comprising:
    contacting the solution with a substance comprising a calcined product of a compound having the formula $A_w B_x(OH)_y C_z \cdot nH_2O$, wherein: A represents a divalent metal cation; B a trivalent metal cation; C a mono- to tetravalent anion; and w, x, y, z and n satisfy the following: $0 < z \leq x \leq 4 \leq w \leq \frac{1}{2}y$ and $12 \geq n \geq \frac{1}{2}(w-x)$.

2. The method of claim 1 wherein the solution is selected from the group consisting of: sodium hydroxide and sodium aluminate.

3. The method of claim 1 wherein the substance comprises calcined hydrotalcite.

4. The method of claim 1 which further includes separating contacted substance from the solution.

5. The method of claim 1 wherein the colorant includes iron.

6. The method of claim 1 wherein the substance contacts the solution by:
    (i) adding the substance to the solution; or
    (ii) passing solution through a containment of the substance.

7. The method of claim 1 wherein the substance is slurried prior to contact with the solution.

8. A method for lowering the colorant content of an aluminate solution obtained by producing aluminum hydroxide from bauxite according to the Bayer process, said method comprising:
    (a) contacting the solution with a substance which includes a calcined product of a compound having the formula $A_6 B_2(OH)_{16} C_z \cdot 4H_2O$, wherein A is selected from: $Mg^{2+}$, $Ni^{2+}$, $Fe^{2+}$ and $Zn^{2+}$; B is selected from: $Al^{3+}$, $Fe^{3+}$ and $Cu^{3+}$; C is selected from: $OH^-$, $Cl^-$, $Br^-$, $NO_3^-$, $CH_3COO^-$, $CO_3^{2-}$, $SO_4^{2-}$, $PO_4^{3-}$, $Fe(CN)_6^{3-}$ and $FE(CN)_6^{4-}$; and $\frac{1}{2} \leq z \leq 2$; and
    (b) separating contacted substance from the solution.

9. The method of claim 8 wherein recitation (a) includes:
    (i) adding the substance directly to the solution; or
    (ii) passing solution through a containment of the substance.

10. The method of claim 9 wherein recitation (i) includes:
    (a) adding the substance to the solution as a powder or in granular form; or
    (b) adding the substance to the solution as a slurry or semi-solid.

11. The method of claim 8 wherein the colorant is selected from the group consisting of: an iron compound, a humic acid and mixtures thereof.

12. The method of claim 8 wherein an aluminum hydroxide precipitated from said solution after contact with the substance contains less than about 0.03% iron by weight.

13. The method of claim 12 wherein the precipitated aluminum hydroxide has a brightness level of at least about 80% based on a 100% $TiO_2$ reference standard.

14. The method of claim 8 wherein the substance comprises calcined hydrotalcite.

15. A method for producing an aluminum hydroxide having improved whiteness levels, said method comprising:
    (a) dissolving an aluminum hydroxide contaminated with colorant including iron in an aqueous solution containing sodium hydroxide;
    (b) contacting the solution with a calcined form of a substance selected from: hydrotalcite, pyroaurite, takovite, and mixtures thereof;
    (c) separating contacted substance from the solution; and
    (d) precipitating the aluminum hydroxide having improved whiteness from the solution.

16. The method of claim 15 wherein recitation (b) includes:
    (i) adding the substance directly to the solution; or
    (ii) passing the solution through a containment of the substance.

17. The method of claim 15 wherein the substance is made by reacting activated magnesia with an aqueous solution of aluminate, carbonate, and hydroxyl ions, then calcining at one or more temperatures between about 400°–650° C.

18. The method of claim 15 which further includes seeding the solution with aluminum hydroxide prior to recitation (d).

19. The method of claim 15 wherein recitation (d) proceeds at one or more temperatures between about 60°–85° C. (140°–185° F.).

20. The method of claim 15 wherein the improved aluminum hydroxide has less than about 0.005% iron by weight and at least about 80% brightness based on a 100% $TiO_2$ reference standard.

* * * * *